Nov. 2, 1937.   G. T. PHELPS   2,097,736
CONTAINER
Filed Oct. 21, 1936   2 Sheets-Sheet 1

Inventor
George T. Phelps

By Clarence A. O'Brien and
Hyman Berman
Attorneys

Nov. 2, 1937.   G. T. PHELPS   2,097,736
CONTAINER
Filed Oct. 21, 1936   2 Sheets-Sheet 2

Inventor
George T. Phelps
By Clarence A. O'Brien and
Hyman Berman
Attorneys

Patented Nov. 2, 1937

2,097,736

UNITED STATES PATENT OFFICE 2,097,736

CONTAINER

George T. Phelps, Forbes, N. Dak.

Application October 21, 1936, Serial No. 106,864

2 Claims. (Cl. 221—112)

This invention relates to containers, and more particularly to containers for dispensing the contents thereof in predetermined bulk.

More particularly, it is an object of the present invention to provide a container especially adapted for dispensing coffee in predetermined amounts, and the invention, together with its objects and advantages will be best understood from a study of the following description taken in connection with the accompanying drawings, wherein:—

Figure 1:
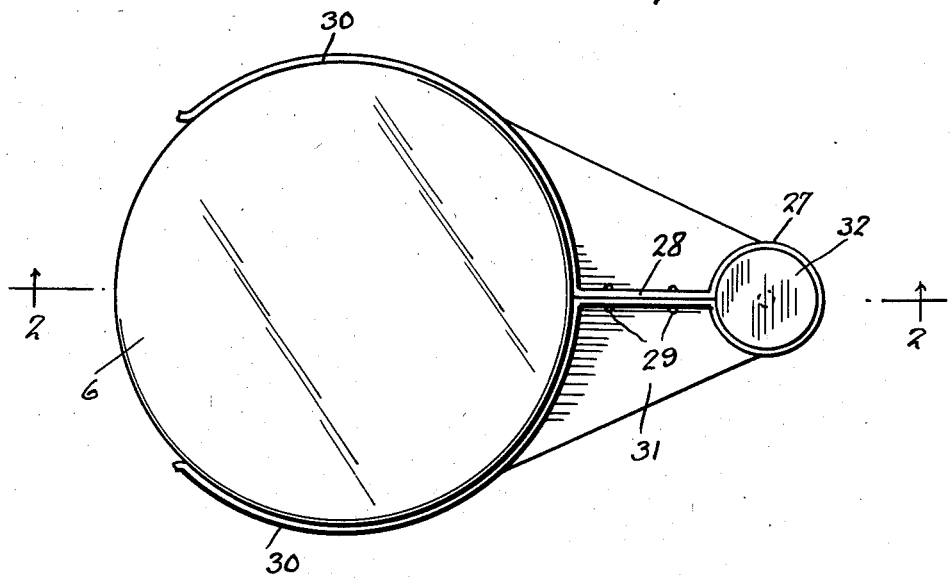
Figure 1 is a top plan view of the container.

Referring to the drawings by reference numerals it will be seen that 5 indicates a substantially cylindrical stand adapted to support thereon a container 6 of glass or other transparent material which latter is adapted to contain coffee to a suitable amount. At one end thereof the stand 5 is provided with threads 7 through the medium of which the stand 5 is fitted on the threaded neck of the receptacle 6. A rubber gasket 7a is provided within the threaded end of stand 5 to abut the edge of the neck of container 6 as shown.

The stand 5 has formed integral therewith and disposed internally thereof at the threaded portion 7 a frusto-conical partition 8 which at its center is provided with a discharge neck 9 the outlet end of which is cut on a bias to accommodate in an inclined position the valve member 10, and is also provided with a packing ring 12 against which valve 10 seats to provide an airtight closure for the neck 9.

The valve member 10 is in the form of an oblong plate having side flanges 11. At about its center, the plate of the valve 10 is provided with an apertured boss 13 to accommodate a valve rod 14 that extends upwardly through the neck 9 and into the container 6.

On the upper end of the valve stem 14 is a substantially conical hollow valve 15 that is provided with guides 16 and 17 to receive the valve stem 14.

Also adjacent its upper end the stem 14 is provided with a collar 18 between which and the guide 16 is confined a spring 19 which tends normally to urge the valve 15 downwardly on the stem.

The stem 14 is also provided with a diagonally disposed collar 20 and a collar 21 between which collars 20 and 21 the valve 10 is accommodated on the stem. Interposed between the boss 13 and collar 21 is a washer 21a of rubber or other suitable material.

The valve 10 is normally and resiliently urged into seated position against the discharge end of the outlet 9 through the medium of a spring 22 that is anchored at one end as at 23 to the wall of the cylindrical support 5.

Figure 2:
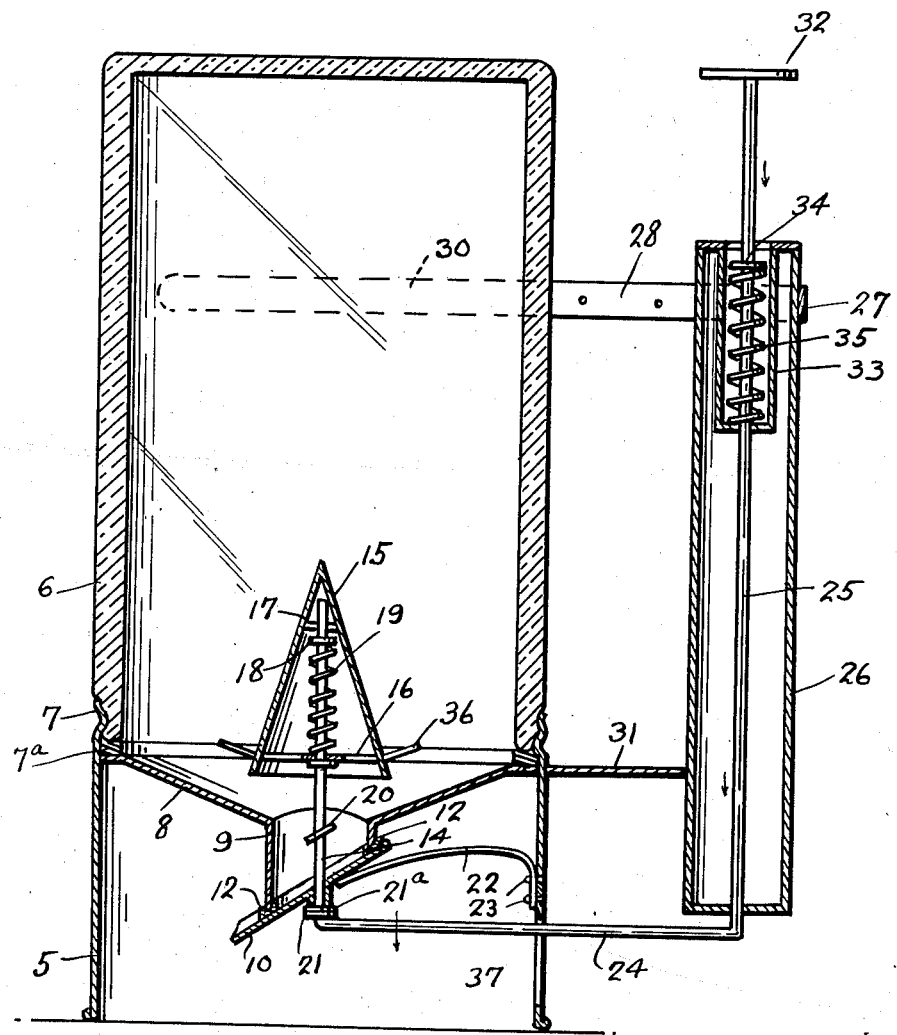
Fig. 2 is a vertical sectional view taken substantially on the line 2—2 of Fig. 1.

From the above, it will be seen that normally the parts are in the position shown in Fig. 2 so that the contents of the container 6 will tend to accumulate on the partition 8 and within the neck 9.

When the valve part 14 is moved downwardly to seat the valve 15 on the partition 8 concentric to the neck 9, the material within the neck 9 will discharge through the neck, valve 10 against the action of spring 22 moving to an open position incidental to the downward movement of the rod 14.

Rod 14 at its lower end is integral with or otherwise secured to the arm 24 of an actuating rod 25. The actuating rod 25 works vertically through a tubular casing 26, the upper end of which is secured within a clamp 27, of the split type.

Clamp 27 is in the form of a split ring which at the opposite sides of the split merges into a pair of arms 28 riveted or otherwise secured together as at 29. Arms 28 merge into arcuate clamping fingers 30 that embrace the container 6 as shown. Through the medium of the clamp just described, the tube 26 is retained in spaced parallel relation to the container 6, a spacing web 31 being provided on the peripheral wall of the supporting member 5 and extending radially therefrom in a manner to engage the lower portion of the tube 26 to cooperate with the clamp 27 for holding the tube 26 perpendicularly and in parallel relation to the container 6.

The rod 25 is provided on its upper end with a handle or knob 32 while within the upper portion thereof the tube 26 is provided with a chamber 33 in which is housed a coiled spring 35, the upper end of which bears against a fixed collar 34 on the rod 25 in a manner to normally urge the rod 25 upwardly and consequently to seat the valve 10 and unseat the valve 15 so that normally the parts are as shown in Fig. 2.

It will thus be seen that when it is desired to dispense a portion of the contents of the inverted receptacle 6, a downward push is exerted on the rod 25 against the action of spring 33.

This will result in an unseating of the valve 10 and in the seating of the valve 15 on the partition 8 so that a predetermined amount of the contents of the container 6 will flow through the neck 9 and into a container or the like provided for receiving the discharged material.

Figure 3:
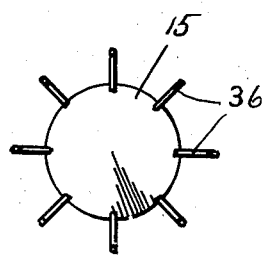
Fig. 3 is a top plan view of a valve member.
Figure 4:
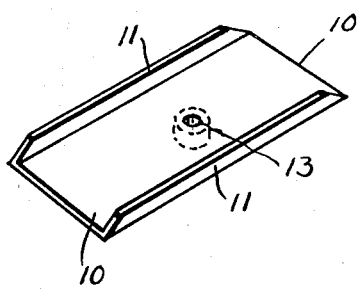
Fig. 4 is a perspective view of a valve member.
Figure 5:
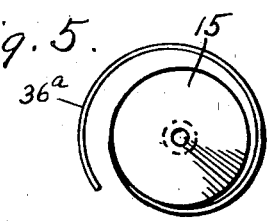
Fig. 5 is a plan view of a slightly modified form of valve member.

If desired, and as shown in Figs. 2 and 3, the valve 15 at its lower or base end may be provided with a radial series of outwardly and upwardly extending agitator fingers 36 or as shown in Figure 5 with a spiral agitator 36a which will serve, incidental to the raising and lowering or in other words the seating or unseating of the valve 15 to agitate the contents of the receptacle 6.

For accommodating the arm 24 and rod 25 the member 5 is provided with a vertical slot 37 as shown.

It will be understood that in actual practice the coffee or the like is placed into the receptacle 6 after which the cylindrical member 5 has its end 7 threaded onto the neck of the member 6. The parts are then disposed in an inverted position which is the position shown in Fig. 2 and are now in readiness for use in dispensing the contents of the receptacle 6 in predetermined quantities.

It is thought that a clear understanding of the construction, utility and advantages of an invention of this character will be had without a more detailed description.

Having thus described the invention, what is claimed as new is:—

1. In a device of the character described, a substantially cylindrical support having a peripheral wall threaded at the upper end thereof, an inverted container having a threaded neck threadedly engaged with said wall of the support, said support being provided internally with a partition having a depending discharge neck, a tubular member disposed laterally of said support and receptacle and in parallelism thereto, a rod having a sliding fit through said tubular member, spring means engaged with the rod normally urging the latter upwardly, said rod having an integral lateral arm extending therefrom through a slot in the wall of said support, a valve rod integral with said arm and extending upwardly through said discharge neck, a valve member on the upper end of the valve rod adapted to seat against the partition for closing the inner end of said neck, and a second valve member for closing the lower end of said neck provided at the center thereof with an apertured boss through which said valve rod extends.

2. In a device of the character described, a substantially cylindrical support having a peripheral wall threaded at the upper end thereof, an inverted container having a threaded neck threadedly engaged with said wall of the support, said support being provided internally with a partition having a depending discharge neck, a tubular member disposed laterally of said support and receptacle and in parallelism thereto, a rod having a sliding fit through said tubular member, spring means engaged with the rod normally urging the latter upwardly, said rod having an integral lateral arm extending therefrom through a slot in the wall of said support, a valve rod integral with said arm and extending upwardly through said discharge neck, a valve member on the upper end of the valve rod adapted to seat against the partition for closing the inner end of said neck, a second valve member for closing the lower end of said neck provided at the center thereof with an apertured boss through which said valve rod extends, and a spring device engaged with said valve rod and the first mentioned valve for normally urging the first-mentioned valve downwardly with respect to said rod, and a spring anchored at one end to said support and having a free end bearing against the second-mentioned valve for normally urging the second mentioned valve in seated position against the lower end of said discharge neck.

GEORGE T. PHELPS.